United States Patent

[11] 3,630,316

[72] Inventors: Pietro Sillano;
Silvano Perlino, both of Pavia, Italy
[21] Appl. No. 16,388
[22] Filed Mar. 4, 1970
[45] Patented Dec. 28, 1971
[73] Assignee Necchi Societa per Azioni
Pavia, Italy
[32] Priority Mar. 7, 1969
[33] Italy
[31] 32406 A/69

[54] LUBRICATING DEVICE FOR ENCLOSED MOTOR COMPRESSOR UNITS
3 Claims, 3 Drawing Figs.

[52] U.S. Cl. ................................... 184/6.16,
308/127, 308/168
[51] Int. Cl. ........................................ F16n 17/00
[50] Field of Search............................. 184/6, 6 L,
6 W, 31, 27; 308/168, 170, 127

[56] References Cited
UNITED STATES PATENTS
2,025,187  12/1935  Werner et al. ............... 184/6 L
2,226,622  12/1940  Lignian ....................... 308/127
2,583,583   1/1952  Mangan ....................... 184/6 L
2,766,929  10/1956  Rusch et al. ................. 184/6
3,253,776   5/1966  Parker ......................... 184/6
3,324,970   6/1967  McHugh ....................... 184/31 X
3,396,664   8/1968  Smith .......................... 184/6 X FOREIGN PATENTS
1,156,598  12/1957  France ......................... 184/6 L
568,991    4/1945  Great Britain ................ 184/6 W
899,663    6/1962  Great Britain ................ 308/168
569,331   11/1957  Italy ........................... 184/6 L

*Primary Examiner*—Manuel A. Antonakas
*Attorney*—Stevens, Davis, Miller & Mosher ABSTRACT: An assembly for lubricating an enclosed horizontal compressor motor comprising a disc mounted on the motor shaft adjacent a flat surface containing a groove which communicates with a lower oil reservoir and an upper sump, from which sump lubricant flows into a recess in said motor shaft and thence through oppositely extending helical grooves in said motor shaft to rotor cooling fins which spray lubricant onto stator coils and through ducts in said motor shaft and in a piston connected to said motor shaft to lubricate a piston cylinder.

INVENTORS
PIETRO SILLANO
SILVANO PERLINO

LUBRICATING DEVICE FOR ENCLOSED MOTOR COMPRESSOR UNITS

The present invention refers to a lubricating device, for enclosed horizontal motor compressor units, comprising a disc, rotating together with a motor shaft, which picks up oil lubricant in the lower part of the housing.

Lubricating systems applied to motor compressor units of the type mentioned, using a disc rotating together with motor shaft to pick up oil from the housing bottom and to distribute it to the members which must be lubricated, are already known in the art. In said systems, the rotating disc plunges into oil collected into the housing and sprays oil, owing to the centrifugal effect, against motor compressor walls comprising the upper part of the compressor unit. In some types of compressors, oil drips from said walls and is collected in one or more oil sumps generally formed in the motor shaft bushing for lubricating couplings, shaft-bushing and crank-connecting rod. In some other types, in which, instead of the usual crank mechanism a yoke is used for its lubrication, oil dripping from said walls is collected into a duct sloping downward, which has its outlet end in correspondence with said yoke.

Said lubricating systems have several disadvantages among which the most important ones are that their efficiency is low because only a part of the oil drawn from the housing reaches conveyor devices, such as said oil sump and said duct, and that oil can be sprayed onto motor compressor members which, for proper operation, should not be wetted by oil lubricant.

In said systems, the rotating disc must plunge rather deeply into oil lubricant collected in the lower housing part for drawing a sufficient amount of oil.

Said fact causes a considerable amount of oil to splash in the housing and an increase in the resistance to the disc motion. Said splashing causes a further worsening in the motor compressor operation and efficiency.

An object of the present invention is to improve systems already known in the art in order to remove the drawbacks mentioned above, nevertheless preserving manufacturing simplicity which characterize said known systems.

The technical problem to be solved in order to achieve the above-mentioned object was to provide a disc rotating together with motor shaft and plunging, not very deeply, into oil lubricant, and a member cooperating with said disc in such a way that it conveys a predetermined amount of lubricant directly to an oil sump formed in the upper part of the motor compressor, avoiding the splashing effect of the same lubricant.

The solution according to the invention is characterized in that said disc is placed in front of and close to a circular flat surface of the motor compressor casting, in which a circumferential groove is formed, said groove having its lower end in communication with the upper part of the oil lubricant layer and its upper end, through a hole formed in the motor compressor casting, in communication with an oil sump, said groove being suitable to cooperate with said disc to drag lubricant by adherence to said oil sump.

Further features will be apparent from the description of a particular embodiment of the lubricating device, not restrictive of the same invention, accompanied by the attached drawings in which.

Figure 1:
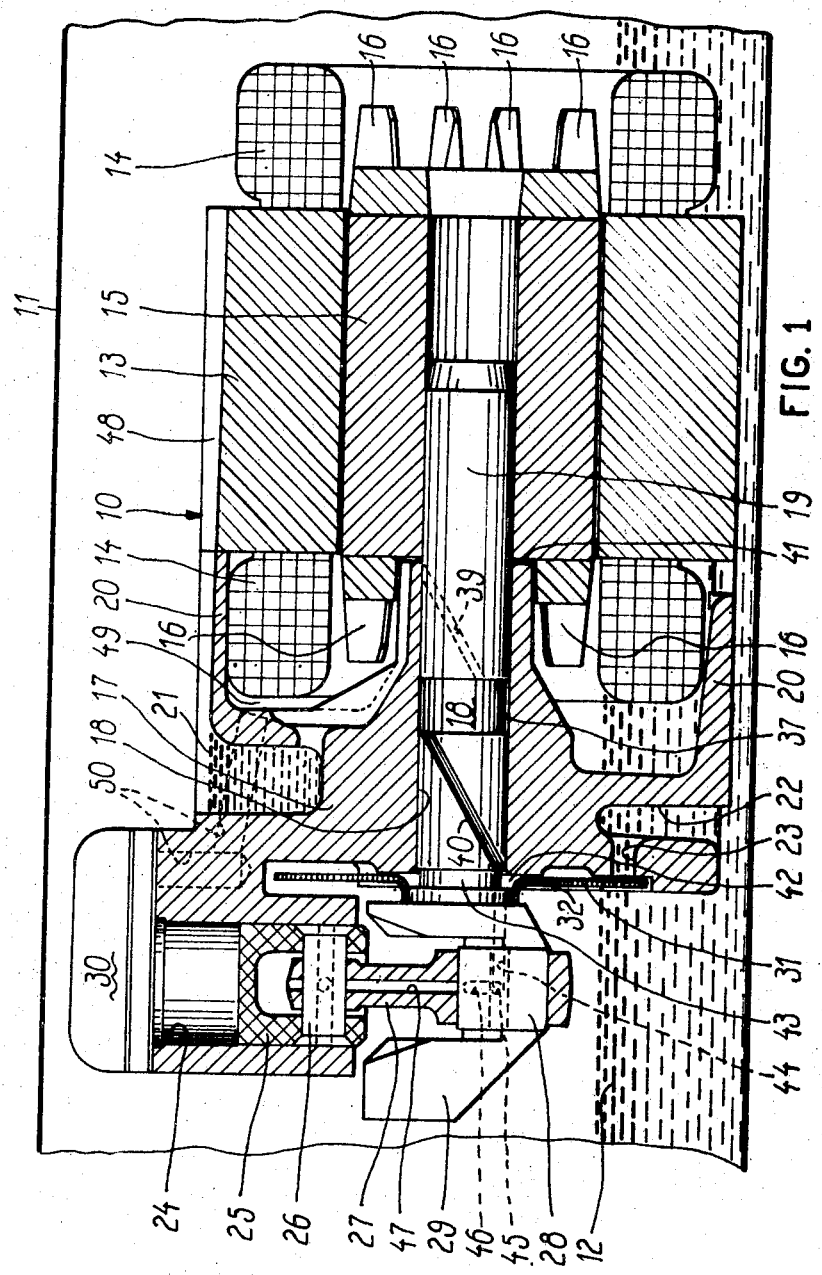
FIG. 1 shows the motor compressor longitudinal section with the lubricating device object of the invention.
Figure 3:
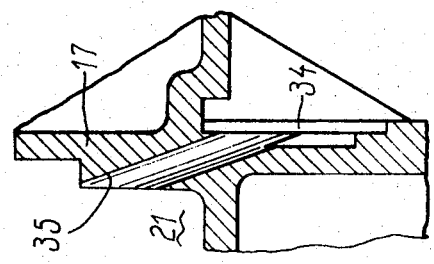
FIG. 3 is a sectional view taken on line 3—3 of FIG. 2.

FIG. 1 shows a motor compressor unit 10 of the horizontal-type and enclosed in housing 11. Said housing contains lubricating oil 12 in its lower part.

Compressor unit 10, which is fastened to the housing in a usual way, comprises a stator 13 provided with stator coils 14 and a rotor 15 of the squirrel-cage-type, provided with cooling fins 16.

Compressor casting 17 is fastened to stator 13; said compressor unit 10 is provided with a horizontal cylindrical hole 18 in which electrical motor shaft 19 is pivoted. Casting 17 has a cup-shaped cylindrical portion 20 in which stator coils 14 are enclosed.

During assembly, said portion 20 is caused to adhere to stator 13 to make an outside unbroken cylindrical surface formed by the stator outside cylindrical surface and by the said casting portion outside cylindrical surface.

Casting 17 has also, in its upper part adjacent to the cup-shaped cylindrical portion 20, an oil sump 21, in which, as will be hereinafter described, lubricating oil is stored, and lower space 22 communicating in the lower part with lubricant 12, and provided, in its upper part, with horizontal hole 23.

Also into casting 17, a vertical axis cylinder 24 is formed in which piston 25 slides with alternating motion, and is fixed by means of wristpin 26 to connecting rod 27 pivoted in turn to crankpin 28 formed in the motor shaft 19. Said motor shaft has a counterweight 29 at its free end. The upper portion of said cylinder is closed, in a usual way, by cylinder head 30 in which discharge and suction valves are provided, not represented in the drawings.

For the realization of the lubricating device object of the invention, a disc 31 is provided, fixed on shaft 19, in such a position as to cover by one of its faces the front surface 32 of compressor casting 17 and to lick, during its revolution the same surface.

Figure 2:
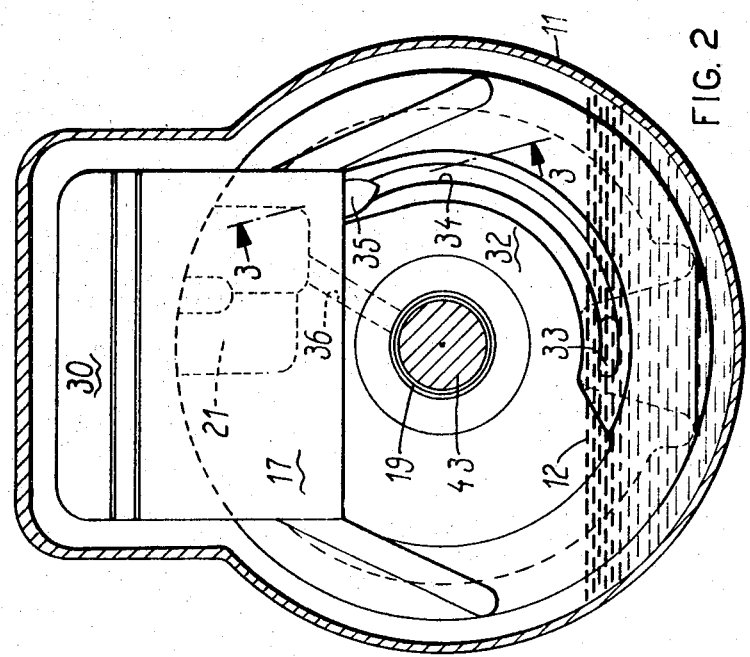
FIG. 2 is a partial cross section of the motor compressor of FIG. 1.

A circumferential groove 34 is formed on the front surface 32 (FIG. 2) of compressor casting 17, as a continuation of outlet 33 of horizontal hole 23. Said groove 34 ends with its upper part in correspondence with the lower end of hole 35 formed in casting 17, which puts groove 34 into communication with oil sump 21 provided in the upper part of casting 17.

During its rotation, disc 31 drags a certain amount of lubricant, owing to adhesive force, along groove 34 giving to said oil lubricant such a value of speed as to reach the level shown in FIG. 1 in the oil sump 21, which is in communication with groove 34, through hole 35. By this feed system, oil lubricant is conveyed to a distributing tank, formed by oil sump 21, thus avoiding splash phenomenons of the splash-lubrication systems, known in the art, in which an oil slinger is used. In the lubricant-feed system of the present invention, it is not necessary for said disc 31 to plunge greatly into oil lubricant 12; it is only necessary for it to cover hole 23. Oil dragging to oil sump 21 takes place owing to lubricant adherence on the face of disc 31 turned to the front face 32 of casting 17 and owing to the dragging tangential forces which every layer exerts on the following one and which are proportional to the viscosity of the same oil lubricant. From oil sump 21 lubricant reaches motor compressor members to be lubricated as described hereinafter.

As oblique duct 36 formed inside casting 17 starts from the lower part of oil sump 21 (FIG. 2), and ends in the space 37, which has the shape of a cylindrical crown, and which is defined by the space between the surface of hole 18 making the bushing for motor shaft 19 and a cylindrical motor shaft portion 38 having a reduced diameter.

From said space 37, by means of two grooves 39 and 40 with opposite helices opportunely made out on shaft 19, oil lubricant is forced into the right and left part, respectively, of the shaft 19-bushing 18 coupling.

In correspondence with the end part of said coupling near rotor 15, lubricant drips downward through passage 41 and, owing to the rotation of the rotor cooling fins, it is sprayed on the stator coils 14, adjacent to casting 17, for cooling them.

In correspondence with the left end portion of motor shaft 19-bushing 18 coupling, oil lubricant gathers in a second recess 42 formed by a face of disc 31 and a further cylindrical surface 43 of shaft 19 having reduced diameter. From said latest recess 42, oil lubricant, having a certain head, blows through horizontal hole 44 formed inside crankpin 28 and radial hole 45, and reaches the crankpin-connecting rod big end coupling in correspondence with groove 46 and then through longitudinal hole 47 of connecting rod, owing to the centrifugal effect, to the wristpin 26-connecting rod small end coupling.

Oil lubricant flowing sideways from wristpin 26 is carried by the alternating movement of piston 25 onto the wall of cylinder 24 to lubricate the piston 25-cylinder 24 coupling.

In its upper part, oil sump 21 communicates with duct 48 defined by the upper part of casting 17 and stator 13. Said duct 48 has a light gradient which allows the lubricant to arrive in correspondence with the left end of stator 13 and to drip on underlying rotor coil fins 16. Owing to the rotation of said coil fins, oil lubricant is sprayed onto stator coils 14 for cooling them.

Stator coils 14 projecting from both stator ends are thus at a rather low temperature and give an improvement in the motor performances under the same power.

Owing to the motor compressor members arrangement and to their conformation, an added soundproofing effect is obtained on the cooling gas suction duct.

In fact gas is sucked from the housing and, passing through the gap 60 between rotor and stator and through the spaces among the stator coils, arrives in recess 49 delimited by cup-shaped portion 20 of casting 17 and of the motor.

From said recess 49 through duct 50 and a suction valve, gas reaches cylinder 24 to be compressed and then, through a discharge valve, is sent to carry out its refrigerating cycle.

Because of the differences of the cross sections of the gap 60 and of recess 49, said members, in series with the intake gas passage, form a muffler recess in the intake duct of the type well known in the art, which contributes substantially to cut noises caused by the motor compressor operation. Also it is important to point out that refrigerating gas, during its course inside the motor, meets the lubricating oil cloud made as hereinabove described, owing to the rotation of rotor cooling fins 16 on which oil lubricant drips, thus incorporating in a proper measure oil bubbles necessary for the lubrication of the suction and discharge valves in order to maintain their proper operation.

What is claimed is:

1. An enclosed motor compressor assembly comprising a reciprocating compressor unit coupled to the shaft of a rotary motor unit and including a first housing enclosing said compressor and motor units, said housing defining a bottom reservoir; a compressor unit casting defining an axially extending housing in which said motor shaft is rotatably mounted, said casting further defining a substantially flat surface which extends at least partially into said reservoir, said casting still further defining a sump; a substantially circumferentially groove in said flat surface which communicates with said reservoir and said sump; and a disc mounted on said shaft and arranged to rotate axially adjacent to said flat surface, said disc being adapted pursuant to rotation thereof, to pick up fluid from said reservoir and to drag it along said groove into said sump; wherein said motor unit comprises a rotor unit mounted on said motor shaft; sets of cooling fins axially mounted on opposite ends of said rotor unit; a stator unit disposed outwardly of said rotor unit, said rotor unit containing axially mounted stator coils disposed adjacent said sets of cooling fins; a passage formed by said cylinder casting and said rotor unit, said passage extending substantially radially from said shaft housing and communicating with a first set of said cooling fins such that fluid flowing through said passage outwardly from said shaft housing is sprayed by said cooling fins onto said adjacent stator coils.

2. The assembly of claim 1, additionally comprising duct means defined by said first housing and said stator unit, said duct means communicating with said sump and a second set of said cooling fins such that fluid flowing through said duct means is sprayed by said cooling fins onto said adjacent stator coils.

3. An enclosed motor compressor assembly comprising a reciprocating compressor unit coupled to the shaft of a rotary motor unit and including a first housing enclosing said compressor and motor units, said housing defining a bottom reservoir; a compressor unit casting defining an axially extending housing in which said motor shaft is rotatably mounted, said casting further defining a substantially flat surface which extends at least partially into said reservoir, said casting still further defining a sump; a substantially circumferentially extending groove in said flat surface which communicates with said reservoir and said sump; and a disc mounted on said shaft and arranged to rotate axially adjacent to said flat surface, said disc being adapted, pursuant to rotation thereof, to pick up fluid from said reservoir and to drag it along said groove into said sump; additionally comprising a piston cylinder formed in said compressor unit casting; a rotor unit mounted on said motor shaft, a stator unit disposed outwardly of said rotor unit and a gap defined between said rotor and said stator units; a muffler recess formed in said casting; a duct formed in said casting extending from said muffler recess and communicating with a suction valve disposed in a cylinder head mounted on said piston cylinder and with a discharge valve disposed in said cylinder head, arranged to permit fluid to flow in turn through said gap, said muffler recess, said duct, said intake valve, said piston cylinder and said discharge valve.

* * * * *